United States Patent [19]

Papiernik et al.

[11] Patent Number: 4,733,150
[45] Date of Patent: Mar. 22, 1988

[54] DEVICE AND METHOD FOR COMPENSATING THE GRAVITATIONAL EFFECT ON AN ELEMENT, RAISABLE AND LOWERABLE BY AN ELECTRIC MOTOR, OF A MACHINE TOOL OR OF A ROBOT

[75] Inventors: Wolfgang Papiernik; Johann Steff, both of Erlangen, Fed. Rep. of Germany

[73] Assignee: Siemens Aktiengesellschaft, Berlin and Munich, Fed. Rep. of Germany

[21] Appl. No.: 894,414

[22] Filed: Aug. 7, 1986

[30] Foreign Application Priority Data

Aug. 9, 1985 [DE] Fed. Rep. of Germany ....... 3528685

[51] Int. Cl.$^4$ .......................................... G05D 23/275
[52] U.S. Cl. ................................... 318/632; 318/631; 318/430; 318/431
[58] Field of Search ................ 318/632, 631, 430, 431

[56] References Cited

U.S. PATENT DOCUMENTS

| | | | |
|---|---|---|---|
| 3,458,791 | 7/1969 | Boice | 318/431 |
| 3,614,996 | 10/1971 | Saito et al. | 187/29 R |
| 3,916,279 | 10/1975 | Kawano et al. | 318/430 |
| 4,452,341 | 6/1984 | Tanahashi | 187/29 R |

FOREIGN PATENT DOCUMENTS 3427127  1/1986  Fed. Rep. of Germany .

Primary Examiner—William M. Shoop, Jr.
Assistant Examiner—Saul M. Bergmann
Attorney, Agent, or Firm—James G. Morrow

[57] ABSTRACT

For use with overhead axes of a machine tool or the axes which ride astride one another of a robot, the gravitational effect can be eliminated for controlled drives if a control variable which opposes the gravitational effect is inserted into the control loop of the controller. By this arrangement, a wide control range can be achieved for the overall machine tool or system.

2 Claims, 2 Drawing Figures

DEVICE AND METHOD FOR COMPENSATING THE GRAVITATIONAL EFFECT ON AN ELEMENT, RAISABLE AND LOWERABLE BY AN ELECTRIC MOTOR, OF A MACHINE TOOL OR OF A ROBOT

FIELD OF THE INVENTION

This invention relates to a device for compensating the gravitational effect on an element, raisable and lowerable by an electric motor, of a machine tool or of a robot, wherein the control variable for the movement of the associated drive acts on said drive through at least one controller in such a manner that a current corresponding to the torque of the drive to be provided at any time is produceable as the manipulated variable.

BACKGROUND OF THE INVENTION

In the case of overhead axes of a machine tool, as well as in the case of the axes of a robot which ride astride of each other, the problem arises that the gravitational effect causes the elements which are raisable and lowerable by an electric motor, to move in an uncontrolled state into the lowered position. In commercial devices, direct compensation of the gravitational force is thereby attempted, for example with springs or hydraulic auxiliary circuits. It is, however, an unfavorable result that means of this type for compensating the gravitational force limit and degrade the control properties of the overall arrangement with respect to the attainable control range because of their additional moving mass and/or their elastic properties.

SUMMARY OF THE INVENTION

It is an object of this invention to create a device for compensating the gravitational force on an element with a wide control range. It is another object of this invention to create a device for compensating the gravitational force on an element without incurring increased costs.

It is also an object of this invention to provide a method for operating such a device.

Briefly stated, in accordance with one aspect of the invention, the aforementioned objects are achieved by providing a device for compensating a gravitational effect on a moveable element of a machine, such as a machine tool or a robot, including a drive connected to the moveable element, an electric motor connected to the drive for operating the drive and raising or lowering the moveable element, at least one controller having as an input a first control variable for moving said drive, and as an output a manipulated variable which corresponds to an instantaneous current supplied to said electric motor inducing a set torque value on said drive, and means for superposing a second control variable on the manipulated variable and forming a combined control variable connected to said motor inducing a supporting torque on the drive system opposing the torque exerted by the gravitational force upon the moveable element.

In another aspect of the invention, the aforementioned objects are achieved by providing a method for compensating a gravitational effect on a moveable element of a machine such as a machine tool or a robot, comprising the steps of positioning the moveable element in a predetermined sequence of positions while setting a controller which initially has no control variable input to maintain each respective position, recording each respective resulting manipulated variable output of said controller which corresponds to each respective predetermined position, superposing as a subsystem control variable each recorded manipulated variable for each of the sequence of positions respectively, and optimizing the setting of the controller.

When the gravitational effect is path-dependent, as is the case in particular for robot operation, an advantageous embodiment of the method is characterized by the fact that, after the controller has been optimized, the superposition of the control variable is removed. The provisional superposition of the control variable thus makes it easier to optimize the controller.

BRIEF DESCRIPTION OF THE DRAWINGS

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF A PREFERRED EMBODIMENT

Figure 1:
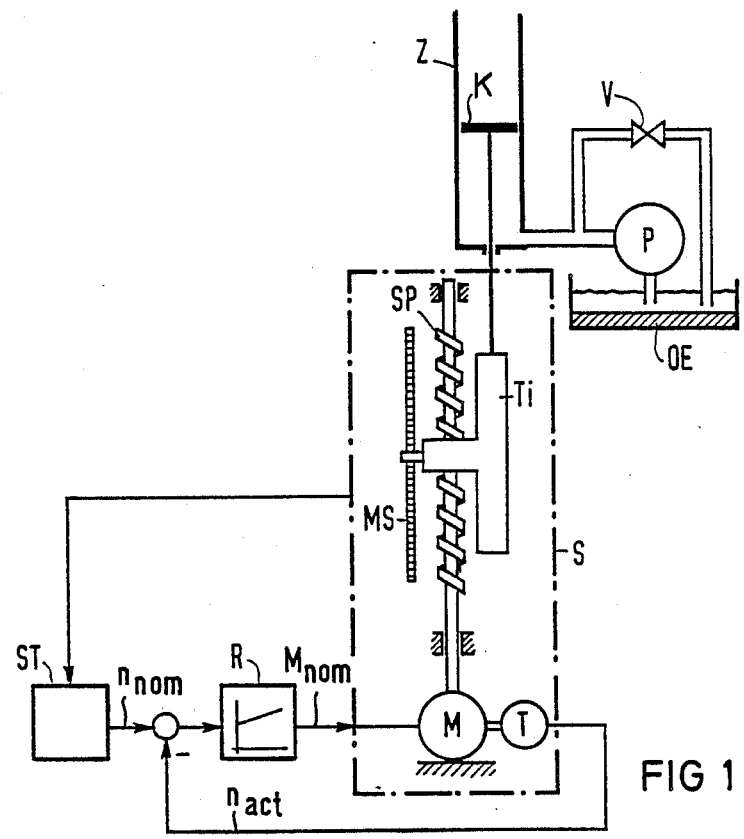
FIG. 1 shows a conventional arrangement for compensating the gravitational effect.

FIG. 1 shows a conventional vertically supported table TI, which is moved by a drive screw SP coupled to a motor M. Such a table is used with a machine tool such as a high speed milling tool, which for clarity's sake is not shown.

In this conventional arrangement, the motor M is controlled from a series of adjusting commands from a machine tool control ST. The machine tool control, ST, is provided with information about the present position of the table TI by means of a measuring system MS, and the control determines numerically a nominal rotation speed $n_{nom}$ for the motor M. The nominal rotation speed $n_{nom}$ is here the control variable for a controller R, which in the sample conventional embodiment is implemented as a PI controller. The motor is connected to a tachogenerator T, which feeds back the instantaneous actual rotation speed $n_{act}$ to the controller R, so that from the deviation between the nominal rotation speed $n_{nom}$ and the actual rotation speed $n_{act}$ the controller R forms the instantaneous nominal torque $M_{nom}$ as a manipulated variable, in the form of a current for the motor M. The overall arrangement of table TI, measuring system MS, drive screw SP, motor M and tachogenerator T is outlined by a dot-dash line and referred to as a subsystem S.

Because of its own weight, the table TI tends to move downward. As a result, a torque is exerted on the motor M through the drive screw SP, which has no lag, the said torque being designated as the gravitational or weight torque $M_G$ in the illustration of FIG. 2. In the device illustrated in Fig. 1, this weight torque $M_G$ is eliminated by virtue of the fact that the table TI is connected to a piston K, which is within a cylinder Z, the piston K exerts a well-defined opposing force with the help of an oil pressure generated by a pump P and adjustable by means of a valve V. The pump P is supplied with oil from an oil pan OE.

Figure 2:
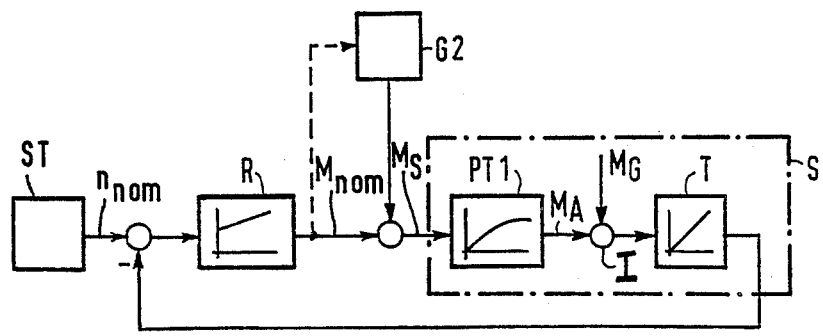
FIG. 2 shows a block diagram of the invention.

FIG. 2 shows a block diagram of the invention, a device in accordance with the arrangement shown in FIG. 1, but the hydraulic weight compensation has been dispensed with. The same elements in FIG. 2 are designated by the same symbols as in FIG. 1.

In FIG. 2, the subsystem S is represented by its equivalent circuit diagram, in which the electrical properties are given by a PT1 element and the mechanical properties are given by an I element.

The function of the device in the context of FIG. 1 will be discussed first. The subsystem S and thus the PT1 element are supplied at the input side with the nominal torque $M_{nom}$ in the form of a current; the motor M generates a drive torque $M_A$ from the said current; the weight torque $M_G$ is superposed on the said drive torque; and the resultant torque leads to an actual rotation speed $n_{act}$. In this way, however, the weight torque $M_G$ is largely eliminated.

The invention is distinguished from the prior art by the fact that this kind of compensation of the weight torque $M_G$ is dispensed with altogether. As a consequence, the superposition of drive torque $M_A$ and weight torque $M_G$ acts on the I element. The compensation of the gravitational effect in accordance with the invention now takes place by virtue of the fact that the nominal torque $M_{nom}$ of the controller R connected ahead of the subsystem is corrected by a control variable $M_S$ in such a manner that the said control variable forms a supporting torque that opposes the torque exerted by the gravitational force on the raisable-and-lowerable element, and thus on the drive and attached motor M. The magnitude and the sense of this control variable can be calculated or measured, and a corresponding control signal can be emitted by a transmitter G2 that is to be adjusted accordingly.

Often, however, it is the case that this control variable is difficult to determine, in particular when this control variable varies as a function of the path. The latter condition holds, in particular, for the axes, which ride astride one another, used with robots. For this reason, in order to determine the control variable from a position stated ahead of time, in particular on initial startup, the following method is employed in accordance with the invention.

First, with the control loop open, i.e., with $n_{act} = 0$, the control sense of the arrangement is determined by releasing mechanical brakes (not shown in FIG. 1 for the sake of clarity) and, for example, briefly exciting the subsystem S with the nominal torque, the sign of the subsystem response being ascertained in the form of actual values of the rotation speed.

The control loop is next closed with robust control parameters. In this way, stable if not especially wide-range control is made possible over the entire range of variation of the subsystem parameters.

If a static condition has been brought about for the instantaneous position, the instantaneous manipulated variable $M_{nom}$ of the controller R is recorded by the transmitter G2, as indicated by a dashed action line between the controller R and the transmitter G2. Subsequently this manipulated variable $M_{nom}$ is superposed on the subsystem S as the control variable $M_S$. The setting of the controller R can be optimized afterward in such a manner as described, by way of example, in the German Application No. P 3,427,127.

In the case of robots, if the perturbing gravitational effect during actual operation following the startup phase is subject to strong, path-dependent fluctuations, the superposition of the control variable $M_S$ can be removed after the controller R has been optimized. Afterward, the compensation is implemented automatically by the controller R. The provisional superposition of the control variable $M_S$ thus offers the advantage that, during the startup phase, the perturbing effect of the weight torque $M_G$ is compensated by the control variable $M_S$, so that the subsystem parameters are unambiguously identified for optimization, so that the adjustment of the controller R is made easier and there is no danger of the robot's suffering a self-induced system breakdown.

The method in accordance with the invention can be used not only with conventional control structures, but also with devices such as state controllers with load-torque monitors. It is quite possible to design the control structures in cascade fashion, with individual control loops being provided for travel, rotation speed and current.

It will now be understood that there has been disclosed an improved system for compensating the gravitational effect in controlled machines. As will be evident from the foregoing description, certain aspects of the invention are not limited to the particular details of the examples illustrated, and it is therefore contemplated that other modifications or applications will occur to those skilled in the art. It it accordingly intended that the claims shall cover all such modifications and applications as do not depart from the true spirit and script of the invention.

What is claimed as new and desired to be secured as Letters Patent of the United States is:

1. A method for compensating a gravitational effect on a moveable element of a machine such as a machine tool or a robot, comprising the steps of:
   positioning the moveable element in a predetermined sequence of positions while setting a controller which initially has no control variable input to maintain each respective position;
   recording each respective resulting manipulated variable output of said controller which corresponds to each respective predetermined position;
   superposing as a subsystem control variable each recorded manipulated variable for each of the sequence of positions respectively; and
   optimizing the setting of the controller.

2. A method according to claim 1, further comprising the steps of:
   removing the superposition of the subsystem control variable after the optimizing of the controller.

* * * * *